(12) United States Patent
Abernethy, Jr. et al.

(10) Patent No.: US 7,978,937 B2
(45) Date of Patent: Jul. 12, 2011

(54) USING PHOTOGRAPHIC IMAGES AS A SEARCH ATTRIBUTE

(75) Inventors: Michael Negley Abernethy, Jr., Pflugerville, TX (US); Travis M. Grigsby, Austin, TX (US); Justin Kai-yuen Hong, Sugar Land, TX (US)

(73) Assignee: International Business Machines Corporation, Armonk, NY (US)

( * ) Notice: Subject to any disclaimer, the term of this patent is extended or adjusted under 35 U.S.C. 154(b) by 1043 days.

(21) Appl. No.: 11/772,354

(22) Filed: Jul. 2, 2007

(65) Prior Publication Data

US 2009/0010548 A1  Jan. 8, 2009

(51) Int. Cl.
*G06K 9/54* (2006.01)
*G06K 9/62* (2006.01)

(52) U.S. Cl. ........................................ 382/305; 382/209
(58) Field of Classification Search .................. 382/190, 382/203, 206, 305, 209, 218; 705/26, 27
See application file for complete search history.

(56) References Cited

U.S. PATENT DOCUMENTS

| | | | |
|---|---|---|---|
| 6,480,846 B2 * | 11/2002 | Kuribayashi et al. ................. | 1/1 |
| 6,512,995 B2 | 1/2003 | Murao | |
| 7,062,722 B1 | 6/2006 | Carlin et al. | |
| 7,171,060 B2 | 1/2007 | Park et al. | |
| 7,801,770 B2 * | 9/2010 | Nelson ............................ | 705/26 |
| 2002/0004764 A1 | 1/2002 | Stolze et al. | |
| 2002/0184111 A1 | 12/2002 | Swanson | |
| 2002/0198785 A1 | 12/2002 | Chae | |
| 2004/0030424 A1 | 2/2004 | Corl, Jr. et al. | |
| 2004/0117271 A1 | 6/2004 | Knight et al. | |
| 2007/0043578 A1 | 2/2007 | Betz et al. | |

* cited by examiner

*Primary Examiner* — Daniel G Mariam
(74) *Attorney, Agent, or Firm* — David Mims; Jeffrey L. Streets (57) ABSTRACT

Method and computer program product including executable instructions on a computer readable medium for using a photographic image in a component search. A plurality of attributes for searching a component information source is gathered, including a photographic image of space available for receiving a component. The photographic image is analyzed to determine the physical dimensions of the space available. A component information source may then be searched to identify components that satisfy the plurality of attributes. The attribute of the photographic image is satisfied with respect to a particular component if the physical dimensions of the space available are determined to allow proper installation of the particular component. Search results are communicated to a user, wherein the results include the identification of at least one component from the information source satisfying each of the plurality of attributes.

23 Claims, 11 Drawing Sheets

USING PHOTOGRAPHIC IMAGES AS A SEARCH ATTRIBUTE

BACKGROUND OF THE INVENTION

1. Field of the Invention

The present invention relates to methods of analyzing photographic images to identify components that are physically compatible with existing components or fixtures.

2. Description of the Related Art

It is common to find databases and web services describing products with detailed information that can be searched. Such searches may include specialized search languages specific to a database or standardized computer language such as the Structured Query Language (SQL). Web search engines are a type of information retrieval system that locates information available on the public web. Enterprise search engines retrieve information from intranets, networks and personal computers.

Depending upon the product or item that is the target of the search, it may be possible to find a great deal of relevant information in this manner. Typical product specifications, such as electronic requirements, basic physical dimensions and color, are commonly available as well as basic terms of sale like price, availability and delivery options. For any specific item identified in the search results, it may be possible to access the originating web service to view images of the item or find even more detailed information about the item, such as user comments or ratings, frequently asked questions (FAQs), or comparisons with related items.

However, the wide variety of products and the unique environments in which they might be used can make it quite difficult to be confident that a product will be suitable. Even with vast amounts of available information about the product, there are situations where there has been no practical substitute for obtaining the product and placing it in the specific intended environment. This trial-and-error approach is wasteful of time, energy and money. Still, many product markets lack the level of information detail that would be required to make a confident purchase.

For example, the process of purchasing new hardware for an existing computer system can be very complex. There are many potential considerations that need to be taken into account before it is possible to identify specific hardware components that are compatible with the overall requirements or constraints of an existing computer system. To be truly compatible, a hardware component must be, for example, able to interface with an available connector, it must be supported by the existing operating system, it must be able to find sufficient power from the power supply of the existing computer system, and it must be able to fit within the chassis of the existing computer system.

As a result, electronic databases have been established that list hardware components by product name, model, type and various operating specifications. These databases enable a consumer, retailer or computer professional to search the database using various known requirements in order to quickly identify one or more hardware components that might be compatible with an exiting computer system. However, there can be a wide range of variability from one computer system to the next, due to the computer systems being made by different manufacturers, ordered with unique combinations of hardware components, or customized by the end user to achieve a desired performance or capability. In fact, the ability of a computer system to be customized for use in accomplishing one or more specific tasks is a desirable quality of a computer system. Still, this situation can reduce confidence that search results from an existing hardware database will be compatible. It is often necessary to engage the assistance of a computer professional to carefully inspect the configuration of the existing computer system, carefully read the specifications for any hardware component identified in the hardware database search results, and potentially consult with a manufacturer's representative to clarify information about any lingering compatibility issues. Frequently, the effort necessary to reach a high level of confidence that a hardware component will be compatible is so great that it is simply more efficient to obtain the hardware, attempt the installation, and return the hardware if it is incompatible.

Hardware manufacturers have access to extensive details about the hardware components they offer for sale and presently make much of this information available and searchable online in order to assist users in identifying compatible components. However, even the most detailed database of available hardware components can not reduce or significantly address uncertainty over the configuration of the existing computer system that is the potential recipient of the hardware component.

A user may be able to efficiently identify basic information about the existing computer system, such as the availability of an expansion slot for additional memory, graphics cards or other purposes. However, the space constraints surrounding the expansion slot may be more difficult to address. Estimates of overall dimensions around the expansion slot may not provide sufficient information to determine the physical compatibility of a hardware component with any great degree of confidence. Accordingly, existing procedures for identifying compatible hardware components are helpful, but there remains no substitute for actually attempting to install the hardware component. Unfortunately, failed attempts to install a hardware component waste the user's time and impose unproductive costs on the retailer and manufacturer of the component.

Therefore, there is a need for an improved system and method for identifying hardware components that are compatible with the configuration of an existing computer system. It would be desirable if the system and method would provide more accurate consideration of physical compatibility in hardware search results. It would also be desirable if the physical compatibility considered the exact present configuration of the computer system in which the hardware component is to be installed.

SUMMARY OF THE INVENTION

The present invention provides a computer program product including executable instructions on a computer readable medium. The computer program product comprises instructions for gathering a plurality of attributes for searching a component database, wherein the plurality of attributes include a photographic image of space available for receiving the component, such as space available adjacent an existing connector within an existing computer system for receiving one of the components. Instructions are also provided for analyzing the photographic image to determine physical dimensions of the space available. The computer program product further includes instructions for searching the component database to identify components that satisfy the plurality of attributes, wherein the attribute of the photographic image is satisfied with respect to a particular component if the physical dimensions of the space available are determined to be sufficient to allow installation of the particular component. Instructions for communicating results of the search to a user are also included, wherein the results include the identification of at least one component from the database satisfying each of the plurality of attributes.

Other embodiments, aspects, and advantages of the invention will be apparent from the following description and the appended claims.

DETAILED DESCRIPTION OF EMBODIMENTS

The present invention provides a method of using a photographic image in a component search, a system for searching with photographic images, and a computer program product including executable instructions on a computer readable medium for performing the method. The method comprises gathering a plurality of attributes for searching a component information source, wherein the plurality of attributes includes a photographic image of space available, such as space available adjacent an existing connector within an existing computer system for receiving one of the hardware components. The photographic image is analyzed to determine the physical dimensions of the space available. A component information source may then be queried to identify components that satisfy the plurality of attributes, wherein the attribute of the photographic image is satisfied with respect to a particular component if the physical dimensions of the space available are determined to be sufficient to allow installation of the particular component. Search results are communicated to a user, wherein the results include the identification of at least one component from the information source satisfying each of the plurality of attributes.

The component information source may include web services and resources as would be accessible through a web search engine or a component database with structured information controlled by a database management system.

While the present invention is broadly directed to the user of photographic images as a search attribute capable of accurately assessing physical compatibility of a component with the available space shown in the photographic image, the following discussion of an embodiment of the invention is directed toward computer hardware components. It should be recognized that the invention is not limited to computer hardware component searches. However, a greater understanding of the invention may be achieved by a detailed discussion of an embodiment of the invention as applied to a particular type of component.

The search for a compatible component in a computer hardware information source includes a photographic image as one of a plurality of search attributes that is applied against the component information source. Since queries may involve indexes that are based upon one or more specific attributes in order to increase the efficiency of the search, using the photographic image as a search attribute does not require that the photographic image, or any other specific attribute, will be compared against each item in the information source or database (or even compared against each item in an index to a hardware database). However, a component will not be included in the search results as having satisfied all of the search attributes unless the photographic image has been analyzed and found to provide physical compatibility with the hardware component. While the order in which the search attributes are applied against each component in the information source is not critical to the present invention, and is better left to standard search optimization techniques, it is believed that an excessive amount of processor-intensive analysis of photographic images can be avoided by comparing the photographic images against the information related to components that have already been identified as satisfying all of the other search attributes.

The photographic image is preferably a digital image, such as a picture taken with a typical digital camera, which can be stored in a file of various types. For example and without limitation, the photographic image may be stored in file having a type selected from JPG, GIF, TIFF, PNG, BMP, RAW, PSD, and PSP, which differ primarily in the extent of data compression, the range of the color pallet and other specific features. In general, the present invention does not rely upon a very high resolution or accurate color shades. Since almost any digital image format is suitable, the format is preferably a format that is common to digital cameras and associated digital photography software applications, and that produces a manageable file size regardless of any significant color accuracy.

Optionally, the photographic image may include a plurality of photographic images or a video of space available adjacent an existing connector within an existing computer system for receiving one of the hardware components. In one embodiment, the plurality of photographic images includes a simple top view and at least one side view of the space available. In another embodiment, the plurality of photographic images are taken from different known angles and spacings in order to facilitate the gathering of sufficient information to generate a three dimensional model of the space available. Such a plurality of photographic images may be still pictures or a video clip.

In accordance with the invention, the dimensions of the space available and dimension of the hardware components may be determined and analyzed with varying levels of complexity, accuracy and granularity. For example, dimensions having a low level of complexity might include the overall the width, height, and depth of the hardware component or the space available. The overall dimensions of the hardware component represent the maximum length, width, and height anywhere on the component and the overall dimensions of the space available represent the minimum length, width, and height anywhere around the connector. Since the printed circuit board of the hardware component and the connector on the motherboard would be installed in alignment, the dimensions should be measured using the interfacing connectors as a primary axis in a Cartesian coordinate system.

Accordingly, at a low level of complexity, it is assumed that both the space available and the hardware component are basic rectangular prisms that align along their connectors. If a rectangular prism constructed having the overall dimensions of the hardware component would fit inside a rectangular prism constructed with the overall dimensions of the space available, then the hardware component is potentially physically compatible depending upon the location of the connector within the space available and the location of the slot connector on the hardware component. If it is assumed that all hardware components are essentially flat on the left side (i.e., where all of the components are secured on the right side of the printed circuit board of the hardware component, such that the slot connector on the hardware component is always on the extreme left side) and that the space available includes only the space above and to the right of the connector on the motherboard, then the physical compatibility is assured using this low level of complexity.

If the former low level complexity comparison does not identify a suitable hardware component as being physically compatible, or if the user simply wants to identify if other hardware components might in fact be physically compatible, then a higher level of complexity may be used in the comparison. Accordingly, the profile of the space available and the profile of a hardware component may be more closely analyzed in two or three dimensions. As an example of a two dimensional profile, the dimensions outlining a profile of the space available and the hardware component are determined as would be seen in a top view as installed. Even though the overall dimensions of the hardware component may not fit within the overall dimensions of the space available (as describe above in the low complexity comparison), this two dimensional profile analysis may show that the hardware component would actually fit in the space available. Such would be the case where features or large appendages, such as heat sinks, fans, and very large capacitors, of the hardware component and other adjacent components (which components delimit the space available) merely overlap or interdigitate without ever occupying the same space.

Should this two dimensional analysis still yield insufficient search results, then it is possible to compare a three dimensional profile or model of the hardware component with a three dimensional profile or model of the space available. While this comparison is more complex and processor intensive, the search results may identify additional hardware components as being compatible even though the simple dimensional comparison and the two dimensional profile comparisons were inconclusive.

Finally, if the three dimensional comparison identifies that the hardware component is physically compatible, it is preferable to perform a further analysis in order to determine which component should be installed first or whether the two components must be installed simultaneously. For example, since the hardware components are installed in their connectors through a substantially vertically downward path, a hardware component that vertically overlaps over the top of another component must be installed last. Similarly, if two hardware components are vertically interdigitated, then they must be installed simultaneously to avoid one component from blocking the other component from being installed in its connector or slot.

It should be recognized from the foregoing discussion, that if a hardware component is determined to fit in the space available using simple dimensional data, then using any of the more accurate models will yield a similar results. Similarly, if it is determined that a hardware component will not fit using the most accurate three dimensional model, then the less accurate models will also conclude that the hardware component will not fit. Furthermore, since the less accurate models are generally less computationally intensive, it is preferable to use these models for comparison first and then, if that model does not determine a successful fit, use successively more accurate models until either the hardware component is determined to fit or the most accurate model indicates that the hardware component does not fit. While this is preferred, it should be recognized that the models may be applied in any order and that a successful implementation may include fewer than all of the possible models. Using a three dimensional model in all circumstances will provide accurate results, but at the expense of processor workload. An intermediate approach uses the simple dimensional model to determine hardware components that are certain to fit, but if that model does not show a fit, then skip the two dimensional models and proceed directly to a three dimensional model to accurately determine if the hardware components fit or not.

To perform the method, it is first necessary to obtain a photographic image of the region in the existing computer system that includes at least the relevant connector and the surrounding components. The user simply takes one or more pictures, preferably from orthogonal angles relative to the connector, and inputs the image files into the search engine. The search engine will utilize the image files and one or more web services to calculate the maximum width, height, and depth that is available for receiving a hardware component. For example, the user can search Ethernet cards, and upload pictures of the empty peripheral component interconnect (PCI) slot and surrounding area where the user intends to install the card.

Optionally, the photographic image of the current system configuration may be supplemented by manual measurements and/or intelligent dimension data gathering. Manual measurements require that the user input the maximum dimensions, i.e., width, height, and/or depth, which the hardware component can occupy in the intended installation. Most preferably, the dimensions should be referenced to the position of the connector in recognition that the connector is a fixed element that cannot be moved. If any of the dimensions of the hardware component are larger than the dimensions of the space available, then the hardware component will be excluded from the search results. For this search, it is sufficient to look up the simple overall dimensions that are typically provided by the manufacturer.

Intelligent dimension data gathering involves identifying or naming one or more of the individual components in the existing computer system by a product identifier, then using a web service or other information source to lookup the known dimensions of that component. Preferably, the user would also provide the location of various ports, slots and bays supporting the individual components, so that a complete model of the computer system can be generated. The search engine can then examine each hardware component in the intermediate search results (i.e., those components satisfying the other search attributes) and attempt to fit its corresponding model into the newly generated system model, as previously described. Such hardware component models may be developed with relatively little effort since most manufacturer's CAD models may be converted to an open standard, such as U3D.

In another embodiment of the invention, a user may maintain a permanent model of their computer system in a file stored on a web service or their computer system's own hard drive for future reference. A subsequent hardware search will access this file in order to avoid re-entry of relevant information. Maintaining such a file may, over time, greatly increase the certainty that a selected hardware component will be physically compatible with the rest of the system.

Yet another embodiment of the invention includes use of a space optimization algorithm that would identify space saving reconfigurations of existing components in order to achieve physical compatibility for a new hardware component. For example, rearranging an existing over-sized component to a different connector on the motherboard, such as the furthest connector to one side, may prevent that component from interfering with access to an adjacent connector. Accordingly, a new hardware component might be determined to fit on the basis of accompanying instructions for reconfiguring or repositioning existing components. Such an analysis begins by identifying the existing types and arrangement of connectors, as well as the existing components that are received in the connectors. Then, each existing component is modeled in each of the appropriate types of connectors. The analysis may continue until a configuration is identified that provides enough space for a new hardware component or it is determined that there are no configurations that would accommodate the new hardware component. This analysis might involve modeling every possible set of hardware/connector combinations or by using a more optimized algorithm.

Still further, hardware components that are able to operate via an extension cable may be identified in the hardware component information source. If the hardware component itself is determined to be physically incompatible with the existing computer system, then the analysis can be repeated on the basis of whether the extension cable will fit in the space available and whether the hardware component will fit elsewhere within the computer system or outside the computer system.

In another embodiment, the hardware component information source may include images of each hardware component for comparison to existing components in the photographic image. In this manner, the images can be compared in order to identify one or more of the existing components. Once an existing component is specifically identified, a three dimensional model or other relevant information about the existing component can be accessed and used in accurately assessing physical compatibility of hardware components. For example, if a user has an existing large universal serial bus (USB) device that blocks the ports next to it (as WiFi devices often do), then the analysis would return a recommendation to use a USB extension cable to facilitate relocation of the existing device so that the new USB device will also fit and both USB connections can be utilized.

Optionally, the search results communicated to the user include more than a list of components satisfying the search attributes, such as providing at least a portion of the photographic image with the component superimposed in its installed position. In this manner, the user can view an image that closely represents how the component will look and fit when installed. Such a generated image will increase the user's confidence that the component will meet their needs. Accordingly, it is believed that the benefits brought about by the present invention will include increased sales and fewer returns.

It should also be recognized that the invention may be utilized in many applications other than computer hardware to determine the physical compatibility of an item within a space available. For example, a photographic image of space available adjacent kitchen cabinets to receive a new refrigerator may be included as a search attribute in a search to identify refrigerators that would fit in that space. Preferably, the photographic image would include one or more standard dimension objects, such as a standard dimension pantry door. Alternatively, a yard stick or other standard dimension item may be positioned in the space during the taking of the photographic image. Have a standard dimension object in the image enables the use of scaling to determine the dimensions of the space available. Still further, analysis of the image may allow identification of the available connections, such as an appropriate electrical outlet and a water line.

Figure 1:
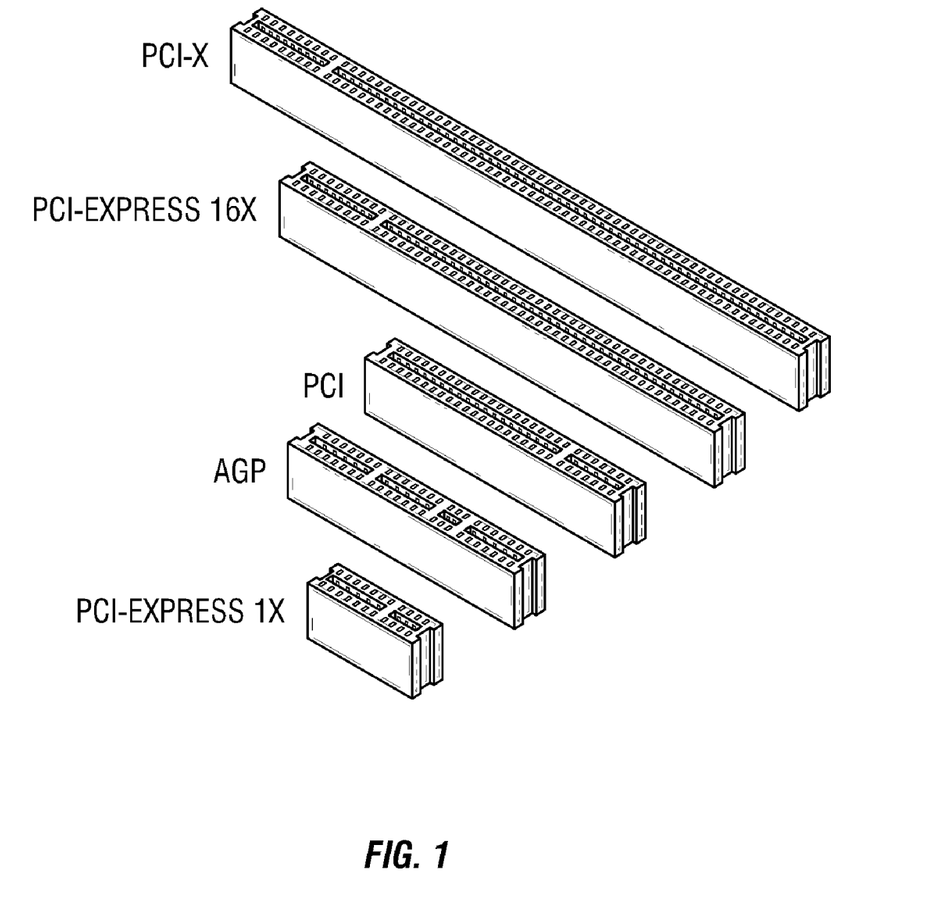
FIG. 1 is a perspective view of various types of standard computer connectors for receiving various hardware components.

FIG. 1 is a perspective view of various types of standard connectors for receiving various hardware components. These connectors have standardized dimensions and designs for receiving printed circuit boards having standardized edge connectors. Accordingly, the presence of any of these connectors in a photographic image of an existing computer system can be easily identified. Furthermore, because their dimensions are known, these connectors can serve as a scale for measuring other existing components in the same photographic image based on the size of the components relative to the connectors. More specifically, the identification of a connector can serve as the basis for a two-dimensional coordinate system across the face of the motherboard, wherein the two axis are the linear axis of the connector and an axis perpendicular to the connector. Still further, the identification of the connector in the photographic image can be used to confirm that a hardware component has the appropriate interface.

Figure 2:
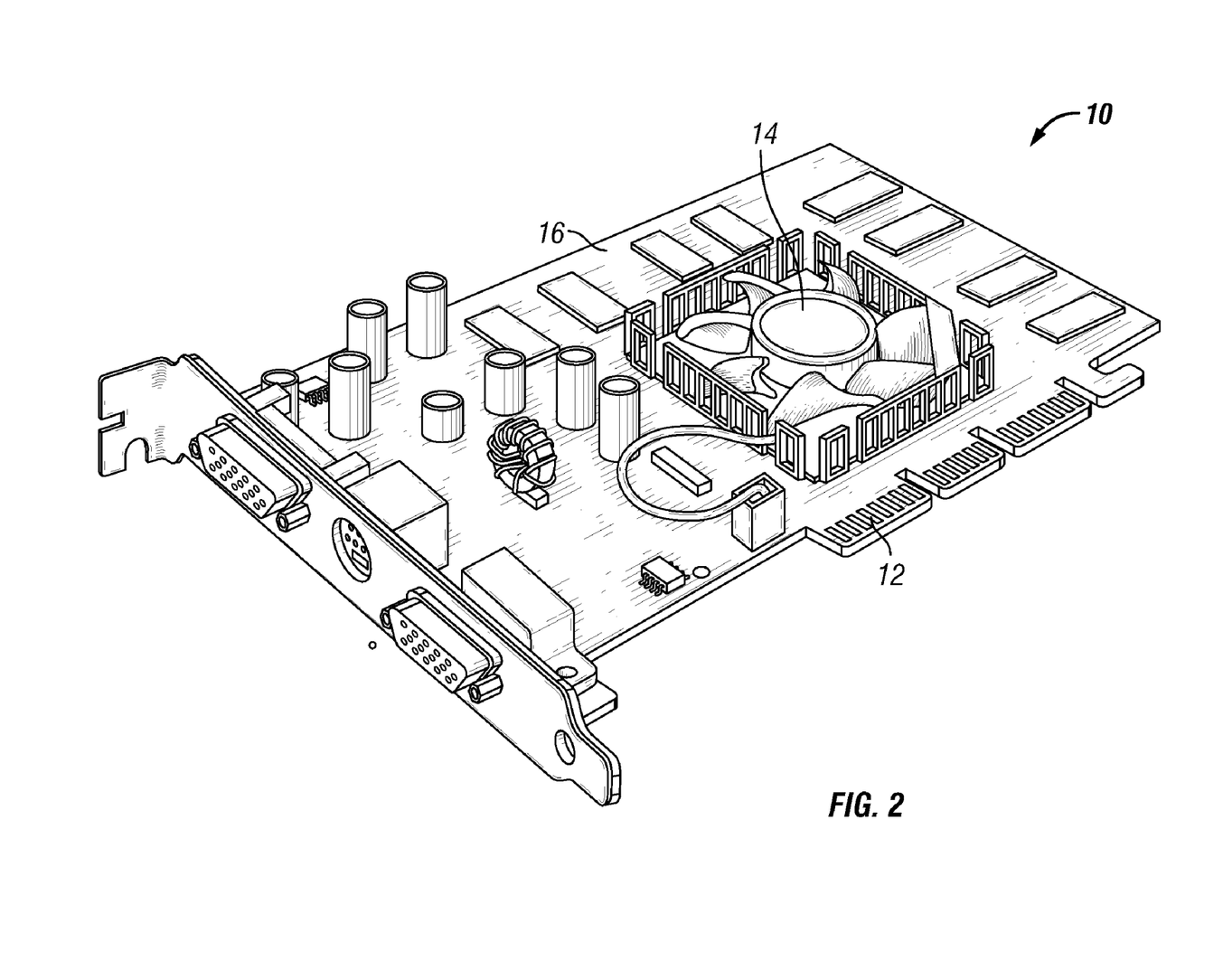
FIG. 2 is a perspective view of a hardware component having an AGP slot connector.

FIG. 2 is a perspective view of a hardware component 10 having an AGP slot connector 12. A cooling fan 14 and other electronic devices are secured to the printed circuit board 16 and contribute to the unique profile of the component 10. The AGP slot connector 12 is used in conjunction with the AGP connector shown in FIG. 1.

Figure 3:
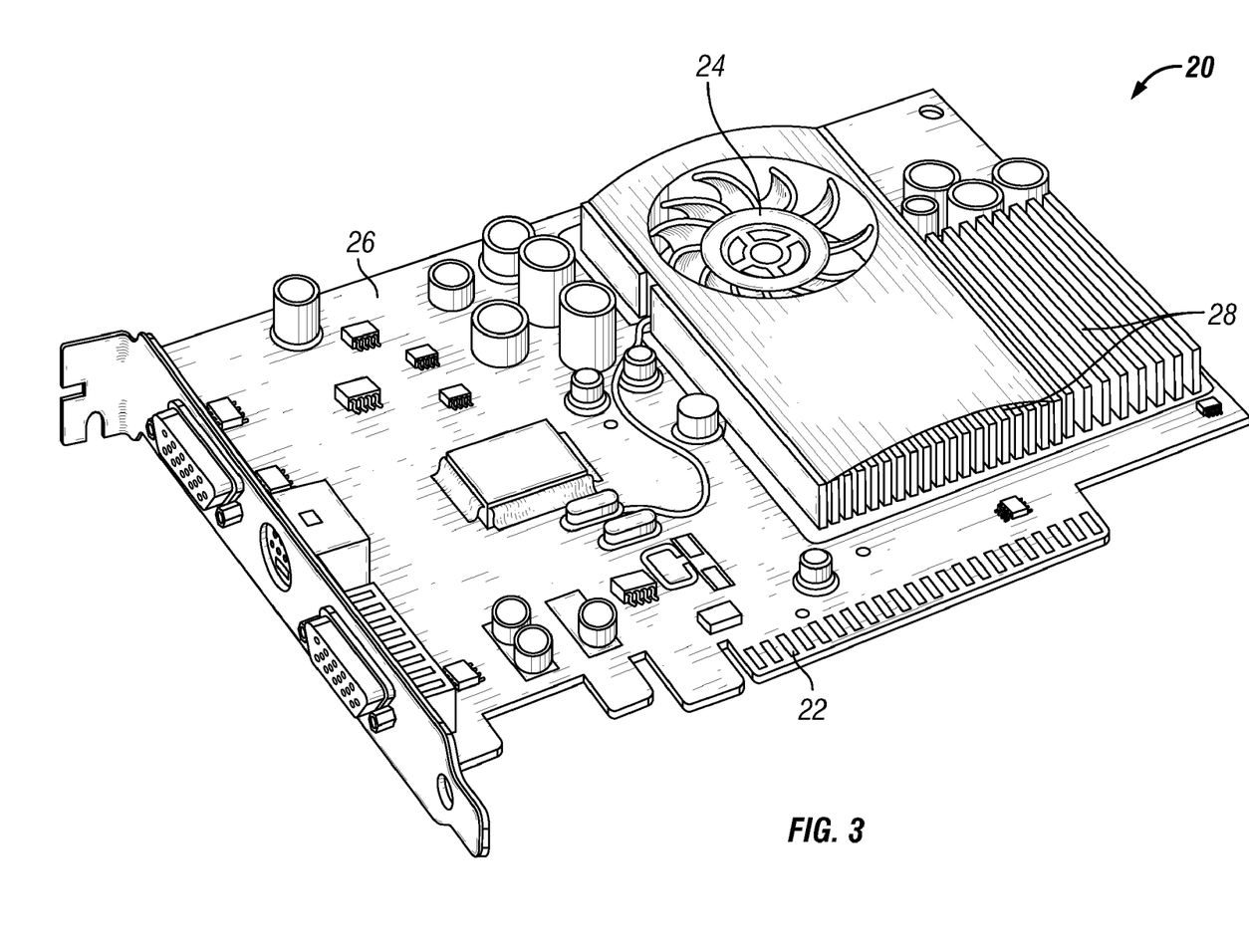
FIG. 3 is a perspective view of a hardware component having a PCI Express 16X slot connector.

FIG. 3 is a perspective view of a hardware component 20 having a PCI Express 16X slot connector 22. A large cooling fan 24 extends to the top edge of the printed circuit board 26 and heat sinks 28 cover a significant portion of the board. The PCI Express 16X slot connector 22 is used in conjunction with the PCI Express 16X connector shown in FIG. 1.

Figure 4:
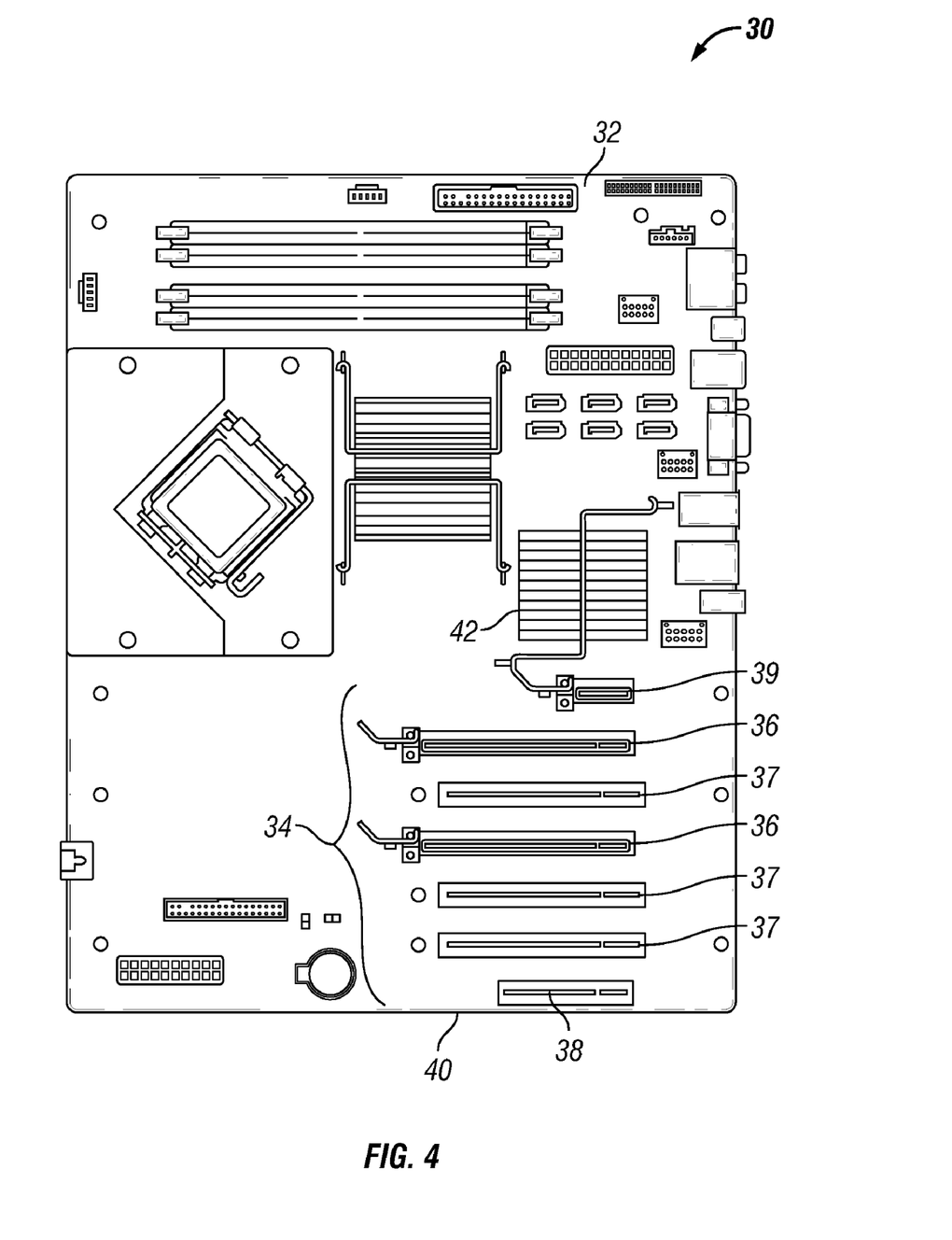
FIG. 4 is a schematic plan view of a motherboard, highlighting the layout of various connectors and components.

FIG. 4 is a schematic plan view of an existing computer system 30, including a motherboard 32, highlighting the fixed layout of various connectors and components. For the present discussion, the focus is on region 34 which contains two PCI-X connectors 36, three PCI-Express 16X connectors 37, one PCI connector 38, and one PCI-Express 1X connector 39. Although this plan view of an existing system does not show any existing hardware component installed in these connectors, it can be noted that individual components may be physically constrained by the size and profile of adjacent components, as well as the wall 40 and heat sink 42. These and other physical constraints may exist in any particular computer system.

Figure 5A:
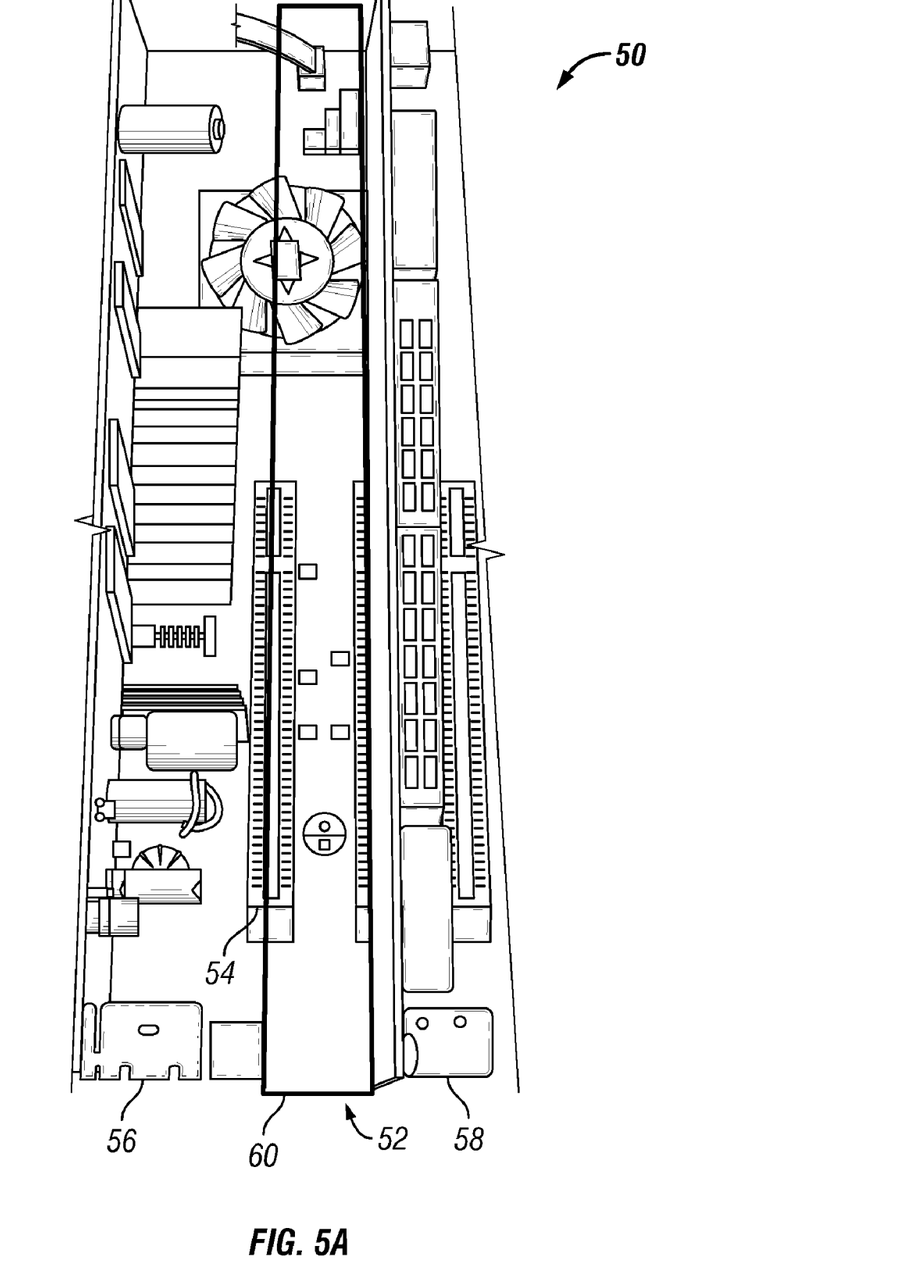
FIGS. 5A-B are photographic images of a top view of a slot containing PCI Express 16X connector and having components installed on both sides.
Figure 5B:
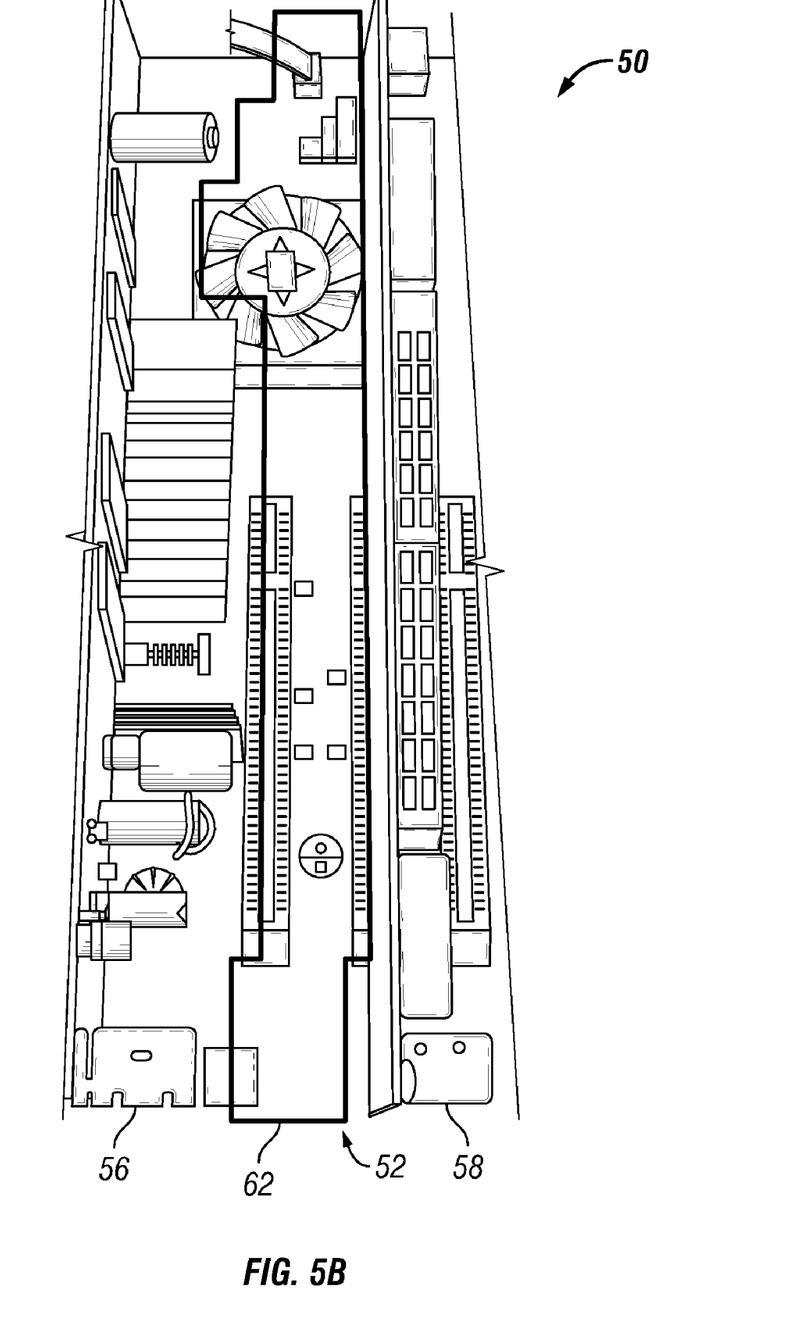

FIGS. 5A-B are photographic images of a top view of an existing computer system 50 having an opening or slot 52 that contains an available PCI Express 16X connector 54 and having a first component 56 installed in a connector on the left side of the slot and a second component 58 installed in a connector on the right side of the slot. FIG. 5A shows a rectangular area 60 of the space available to receive a hardware component. Using a two dimensional information, FIG. 5B shows a profiled area 62 of the space available. While the profiled area 62 is a more accurate representation of the width and length of the area available to receive a hardware component, it is simpler to deal with the basic dimensions of the rectangular area 60 so long as physical compatibility can be assessed. As previously discussed, if the basic dimensional analysis indicates that a hardware component is in fact physically compatible, then it is not necessary to consider more complex two dimensional or three dimensional models.

Figure 6A:
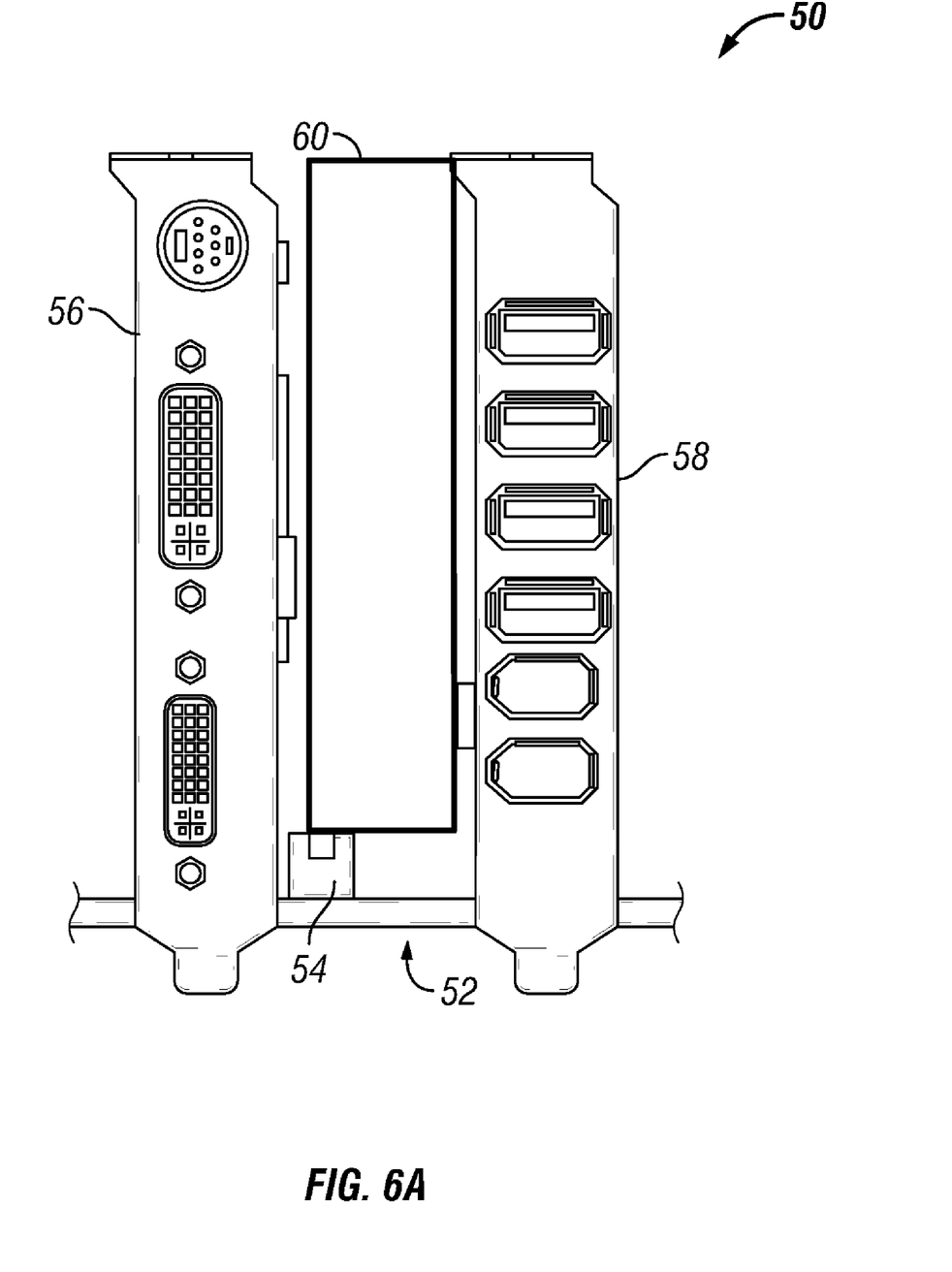
FIG. 6A-B are photographic images of a back end view of the slot of FIGS. 5A-B.
Figure 6B:
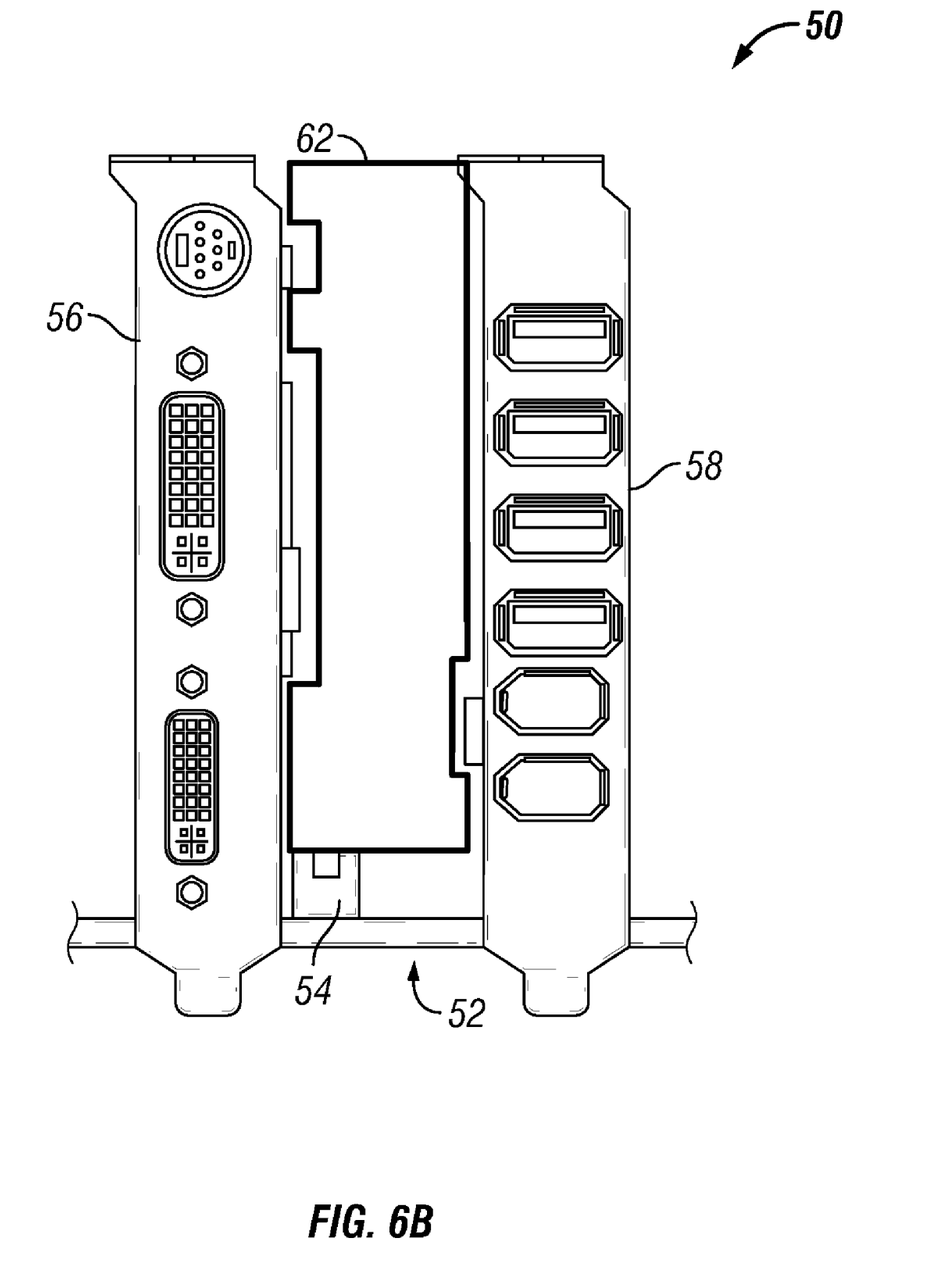

FIG. 6A-B are photographic images of a back end view of the existing computer system 50 of FIGS. 5A-B. FIG. 6A includes the rectangular area 60 defined by basic dimensions that establish the space available. Combining the basic dimensions (width and length) of area 60 in FIG. 5A with the basic dimensions (width and height) of area 60 in FIG. 6A, the space available can be described as a rectangular prism having known dimensions. If a hardware component is compatible with the connector 54 and the basic dimensions of the hardware component are less than the space available 60, then it is determined that the hardware component is satisfactory for use in the existing system 50. However, if the hardware component has one or more basic dimension greater than the corresponding basic dimension of the space available, then further analysis is necessary to determine physical compatibility. Accordingly, the two dimensional profile 62 of FIG. 5B may be combined with the height of the area 60 in FIG. 6A in order to provide a more accurate assessment of the space available. Such an analysis may also be performed by combining the width/height profile 62 of FIG. 6B with the length in FIG. 5A or FIG. 5B, or by analyzing both the width/height profile 62 of FIG. 6B as well as the width/length profile 62 of FIG. 5B.

If width/length profile and height of the hardware component does not fit within this more accurate identification of the space available, then a three dimensional analysis is necessary. A complete three dimensional model of the hardware component will appear as the detailed image in FIG. 2 or FIG. 3, and a three dimensional model of the space available will appear as the detailed image in FIG. 5A and FIG. 5B.

Figure 7A:
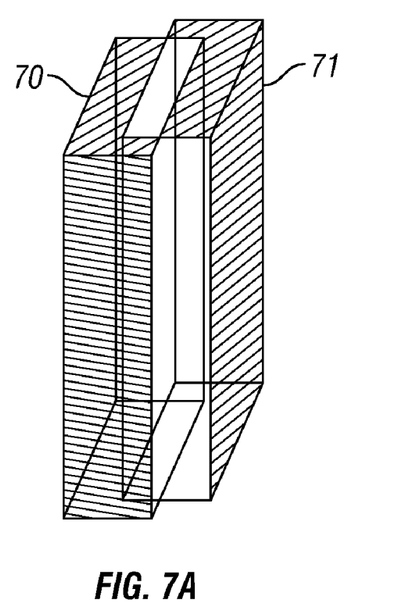
FIGS. 7A to 7D are schematic diagrams that shows how the physical compatibility of two adjacent components may be determined.
Figure 7B:
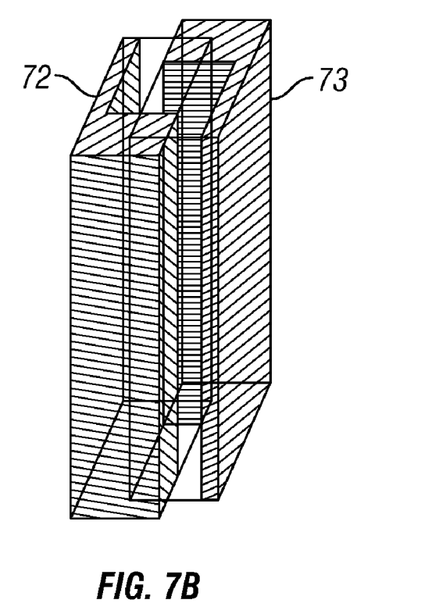
Figure 7C:
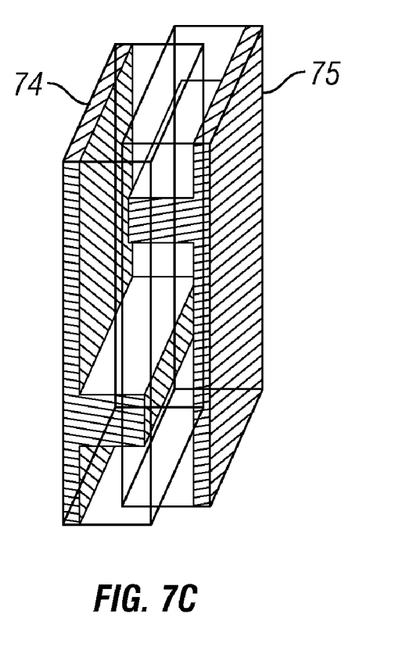
Figure 7D:
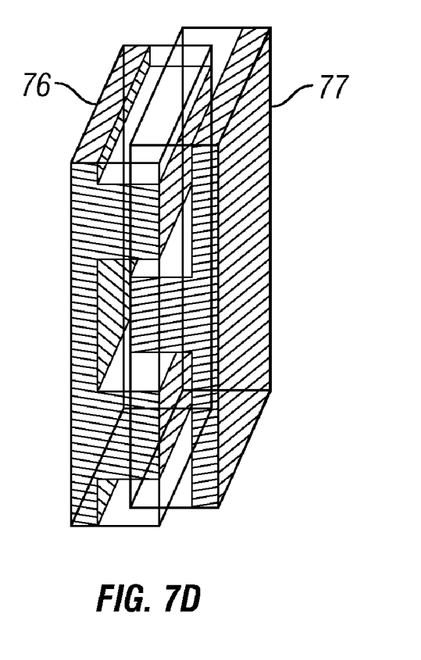

FIG. 7A is a schematic diagram that shows how two adjacent components 70, 71 are seen to be physically incompatible when using only basic dimensions. FIG. 7B is a schematic diagram that shows how two adjacent components 72, 73 are found to be compatible when the width/length profile is analyzed. FIG. 7C is a schematic diagram that shows how two adjacent components 74, 75 are found to be compatible when the width/height profile is analyzed. FIG. 7D is a schematic diagram that shows how two adjacent components 76, 77 are found to be compatible when the width/height profile is analyzed and the components are installed simultaneously.

Figure 8:
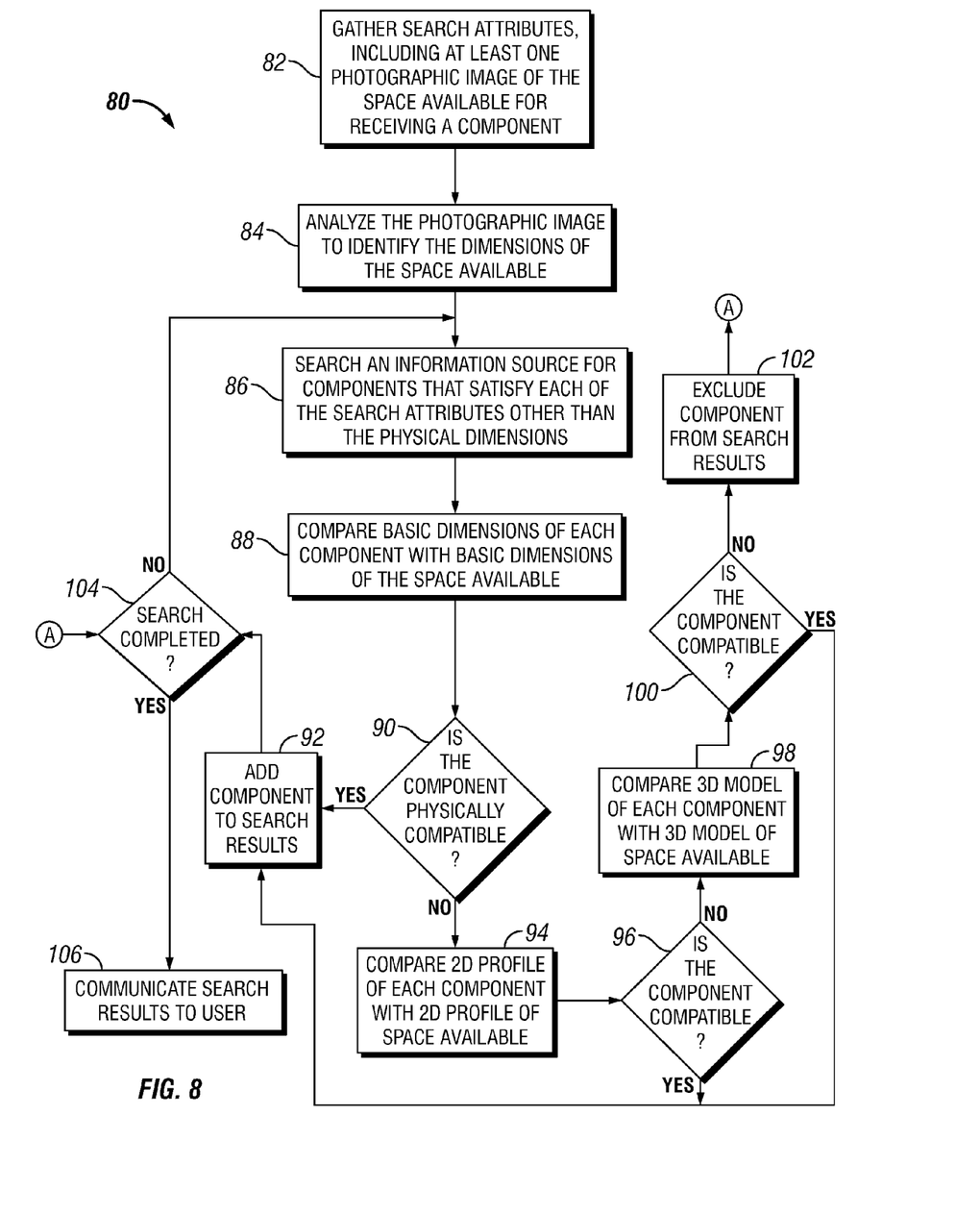
FIG. 8 is a flowchart of a method for searching a hardware component database using a photographic image of an existing computer system to determine the physical compatibility of the hardware components.

FIG. 8 is a flowchart of a method for searching a hardware component information source using a photographic image of an existing computer system to determine the physical compatibility of the hardware components. In step 82, search attributes are gathered, including at least one photographic image of the space available for receiving a component. In step 84, the photographic image is analyzed to identify the dimensions of the space available. An information source is then searched, in step 86, to identify components that satisfy each of the search attributes other than the physical dimensions.

In step 88, a first comparison is made between the basic dimensions of each component and the basic dimensions of the space available. If the component is determined to be physically compatible in step 90, then the component is added to the search results in step 92. If the component is not yet determined to be physically compatible in step 90, then a two dimensional profile of each component is compared with a two dimensional profile of the space available in step 94. If the component is determined to be physically compatible in step 96, then the component is added to the search results in step 92. If the component is not yet determined to be physically compatible in step 96, then a three dimensional model of each component is compared with a three dimensional model of the space available in step 98. If the component is determined to be physically compatible in step 100, then the component is added to the search results in step 92. If the component is not determined to be physically compatible in step 10, then the component is excluded from the search results in step 102. The process of step 86 through step 102 continues for each component until the search is determined to be completed in step 104. Finally, the search results are communicated to the user in step 106.

A photographic image may be analyzed using pattern recognition. Pattern recognition is the act of taking in raw data and taking an action based on the category of the data. Pattern recognition aims to classify data (patterns) based on either a priori knowledge or on statistical information extracted from the patterns. The patterns to be classified are usually groups of measurements or observations, defining points in an appropriate multidimensional space. A pattern recognition system utilizes input in order to gather the observations to be classified or described, a feature extraction mechanism that computes numeric or symbolic information from the observations, and a classification or description scheme that does the actual job of classifying or describing observations, relying on the extracted features. The classification or description scheme is usually based on the availability of a set of patterns that have already been classified or described. This set of patterns is termed the training set and the resulting learning strategy is characterized as supervised learning. In the present use of pattern recognition, the classification or description scheme will usually use a structural pattern recognition approach that is based on the structural interrelationships of features. Preferably, the pattern recognition deals with digital images as input to a pattern recognition system in order to identify various components, such as the PCI slot and the dimensions of adjacent PCI boards.

It should be recognized that the invention may take the form of an embodiment containing hardware and/or software elements. Non-limiting examples of software include firmware, resident software, and microcode. More generally, the invention can take the form of a computer program product accessible from a computer-readable medium providing program code for use by or in connection with a computer or any instruction execution system. For the purposes of this description, a computer-usable or computer readable medium can be any apparatus that can contain, store, communicate, propagate or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W), and DVD.

A data processing system suitable for storing and/or executing program code typically includes at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution.

Input/output (I/O) devices such as keyboards, displays, or pointing devices can be coupled to the system, either directly or through intervening I/O controllers. Network adapters may also be used to allow the data processing system to couple to other data processing systems or remote printers or storage devices, such as through intervening private or public networks. Modems, cable modems, Ethernet cards, and wireless network adapters are examples of network adapters.

Figure 9:
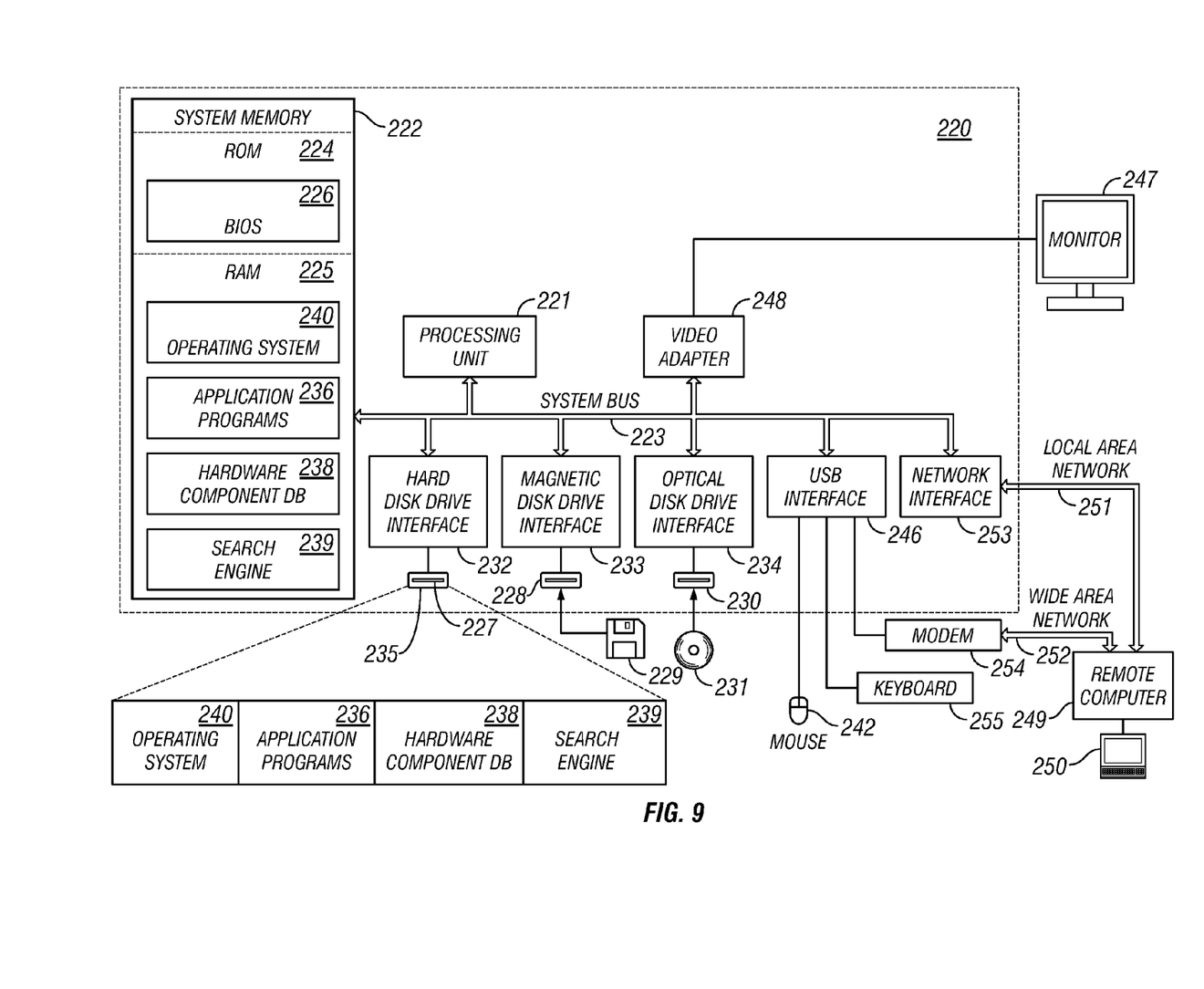
FIG. 9 is a schematic diagram of a computer system that may be configured for determining physical compatibility of hardware components according to an illustrative embodiment of the invention.

FIG. 9 is a schematic diagram of a computer system generally indicated at 220 that may be configured for using a photographic image as an attribute in searching an information source to identify components that are physically compatible with an existing system as identified in the photographic image. The computer system 220 may be a general-purpose computing device in the form of a conventional computer system 220. The computer system 220 may, itself, include the target system for which a hardware component is to be identified. Alternatively, the computer system 220 may be external to the target system. Generally, computer system 220 includes a processing unit 221, a system memory 222, and a system bus 223 that couples various system devices, including the system memory 222 to processing unit 221. System bus 223 may be any of several types of bus structures including a memory bus or memory controller, a peripheral bus, and a local bus using any of a variety of bus architectures. The system memory includes a read only memory (ROM) 224 and random access memory (RAM) 225. A basic input/output system (BIOS) 226 is stored in ROM 224, containing the basic routines that help to transfer information between elements within computer system 220, such as during start-up.

Computer system 220 further includes a hard disk drive 235 for reading from and writing to a hard disk 227, a magnetic disk drive 228 for reading from or writing to a removable magnetic disk 229, and an optical disk drive 230 for reading from or writing to a removable optical disk 231 such as a CD-R, CD-RW, DV-R, or DV-RW. Hard disk drive 235, magnetic disk drive 228, and optical disk drive 230 are connected to system bus 223 by a hard disk drive interface 232, a magnetic disk drive interface 233, and an optical disk drive interface 234, respectively. Although the exemplary environment described herein employs hard disk 227, removable magnetic disk 229, and removable optical disk 231, it should be appreciated by those skilled in the art that other types of computer readable media which can store data that is accessible by a computer, such as magnetic cassettes, flash memory cards, digital video disks, Bernoulli cartridges, RAMs, ROMs, USB Drives, and the like, may also be used in the exemplary operating environment. The drives and their associated computer readable media provide nonvolatile storage of computer-executable instructions, data structures, program modules, and other data for computer system 220. For example, the operating system 240 and application programs 236 may be stored in the RAM 225 and/or hard disk 227 of the computer system 220.

A user may enter commands and information into computer system 220 through input devices, such as a keyboard 255 and a mouse 242. Other input devices (not shown) may include a microphone, joystick, game pad, touch pad, satellite dish, scanner, or the like. These and other input devices are often connected to processing unit 222 through a USB (universal serial bus) 246 that is coupled to the system bus 223, but may be connected by other interfaces, such as a serial port interface, a parallel port, game port, or the like. A display device 247 may also be connected to system bus 223 via an interface, such as a video adapter 248. In addition to the monitor, personal computers typically include other peripheral output devices (not shown), such as speakers and printers.

The computer system 220 may operate in a networked environment using logical connections to one or more remote computers 249. each of the one or more remote computers 249 may be another personal computer, a server, a client, a router, a network PC, a peer device, a mainframe, a personal digital assistant, an internet-connected mobile telephone or other common network node. While a remote computer 249 typically includes many or all of the elements described above relative to the computer system 220, only a memory storage device 250 has been illustrated in FIG. 6. The logical connections depicted in the figure include a local area network (LAN) 251 and a wide area network (WAN) 252. Such networking environments are commonplace in offices, enterprise-wide computer networks, intranets, and the internet.

When used in a LAN networking environment, the computer system 220 is often connected to the local area network 251 through a network interface or adapter 253. When used in a WAN networking environment, the computer system 220 typically includes a modem 254 or other means for establishing high-speed communications over WAN 252, such as the internet Modem 254, which may be internal or external, is connected to system bus 223 via USB interface 246. In a networked environment, program modules depicted relative to computer system 220, or portions thereof, may be stored in the remote memory storage device 250. It will be appreciated that the network connections shown are exemplary and other means of establishing a communications link between the computers may be used.

Program modules may be stored on hard disk 227, optical disk 231, ROM 224, RAM 225, or even magnetic disk 229. The program modules may include portions of an operating system 240, application programs 236, or the like. A hardware component database 238 may be included, which may identify existing hardware components in the computer system 220. A search engine 239 may also be included for executing the component search in accordance with the invention.

Aspects of the present invention may be implemented in the form of an application program 236. Application program 236 may be informed by or otherwise associated with hardware component database 238 and/or search engine 239. The application program 236 generally comprises computer-executable instructions for analyzing the photographic images according to the invention.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer program product including executable instructions on a non-transitory computer readable medium comprising:
    instructions for gathering a plurality of attributes for searching a hardware component database, wherein the plurality of attributes include at least one photographic image of space available adjacent an existing connector within an existing computer system for receiving one of the hardware components;
    instructions for analyzing the photographic image to determine physical dimensions of the space available;
    instructions for searching the hardware component database to identify hardware components that satisfy the plurality of attributes, wherein a particular hardware component satisfies the photographic image attribute if the physical dimensions of the space available are determined to be sufficient to allow installation of the particular hardware component; and
    instructions for communicating results of the search to a user, wherein the results include the identification of at least one hardware component from the database satisfying each of the plurality of attributes.

2. The computer program product of claim 1, wherein the instructions for analyzing the photographic image includes instructions for identifying patterns in the photographic image data and comparing the identified patterns with one or more stored patterns associated with a hardware component.

3. The computer program product of claim 1, wherein the hardware component database is located on a server.

4. The computer program product of claim 1, wherein the photographic image is selected from the group of images consisting of a top view, side view, and end view.

5. The computer program product of claim 4, further comprising:
    instructions for gathering identification of at least one dimension or a standard dimension component in the photographic image.

6. The computer program product of claim 1, wherein the plurality of attributes includes two or more photographic images taken from two or more views selected from the group consisting of a top view, a right side view, a left side view, a front end view, and a back end view.

7. The computer program product of claim 6, wherein the two or more views are taken at substantially orthogonal angles relative to each other.

8. The computer program product of claim 1, wherein the dimensions are determined relative to the position of the connector available for receiving a hardware component.

9. The computer program product of claim 1, wherein the analysis of the photographic image determines a physical dimension selected from the group consisting of height available above the connector, length of the connector, length available from the front end of the connector, length available from the back end of the connector, width right of the connector, width left of the connector, and combinations thereof.

10. The computer program product of claim 9, wherein the photographic image includes a top view of the space available and the analysis of the photographic image determines a physical dimension selected from the group consisting of length of the connector, length available from the front end of the connector, length available from the back end of the connector, width right of the connector, width left of the connector, and combinations thereof.

11. The computer program product of claim 9, wherein the photographic image includes a side view or end view of the space available and the analysis of the photographic image determines the physical dimension of the height available above the connector.

12. The computer program product of claim 1, further comprising:
    instructions for receiving identification of existing components adjacent the existing connector;
    instructions for preparing a model of at least a portion of the space available based on the physical configuration and known dimensions of the existing components identified; and
    instructions for identifying hardware components having physical dimensions that are compatible with the space available according to the model.

13. The computer program product of claim 12, further comprising:
    instructions for identifying hardware components having an installation path that is compatible with the existing components.

14. The computer program product of claim 12, further comprising:
    instructions for identifying hardware components having an installation path that is compatible with the existing components only when installed in a specific order.

15. The computer program product of claim 14, further comprising:
    instructions for communicating to a user instructions regarding any specific installation order identified as necessary for a hardware component to be physically compatible.

16. The computer program product of claim 1, wherein the space available and the physical dimensions of the hardware components consist of simple dimensional data.

17. The computer program product of claim 1, wherein the space available and the physical dimensions of the hardware components consist of a two-dimensional profile and simple dimensional data.

18. The computer program product of claim 1, wherein the space available and the physical dimensions of the hardware components consist of three dimensional data.

19. The computer program product of claim 1, further comprising:
    instructions for communicating a hardware reconfiguration scenario to the user, wherein the reconfiguration scenario allows at least one additional hardware component to be identified as meeting the criteria.

20. The computer program product of claim 1, wherein the instructions for identifying hardware components having physical dimensions that are compatible with the space available further include:
    instructions for performing a series of comparisons between the physical dimensions of each hardware component and the space available, wherein each of the comparisons have a different level of accuracy.

21. The computer program product of claim 20, further comprising:
    instructions for halting the series of comparisons for an individual hardware component in response to one of the series of comparisons identifying that the individual hardware component is physically compatible or that the individual hardware component is not physically compatible.

22. A method comprising:
    gathering a plurality of attributes for searching a hardware component database, wherein the plurality of attributes include at least one photographic image of space available adjacent an existing connector within an existing computer system for receiving one of the hardware components;

analyzing the photographic image to determine physical dimensions of the space available;

searching the hardware component database to identify hardware components that satisfy the plurality of attributes, wherein a particular hardware component satisfies the photographic image attribute if the physical dimensions of the space available are determined to be sufficient to allow installation of the particular hardware component; and communicating results of the search to a user, wherein the results include the identification of at least one hardware component from the database satisfying each of the plurality of attributes.

23. The method of claim 22, wherein analyzing the photographic image includes identifying patterns in the photographic image data and comparing the identified patterns with one or more stored patterns associated with a hardware component.

* * * * *